June 4, 1968  R. B. BRUNDAGE  3,387,178
HIGH FREQUENCY VOLTAGE INJECTOR CIRCUITS FOR WELDERS
Filed April 1, 1965
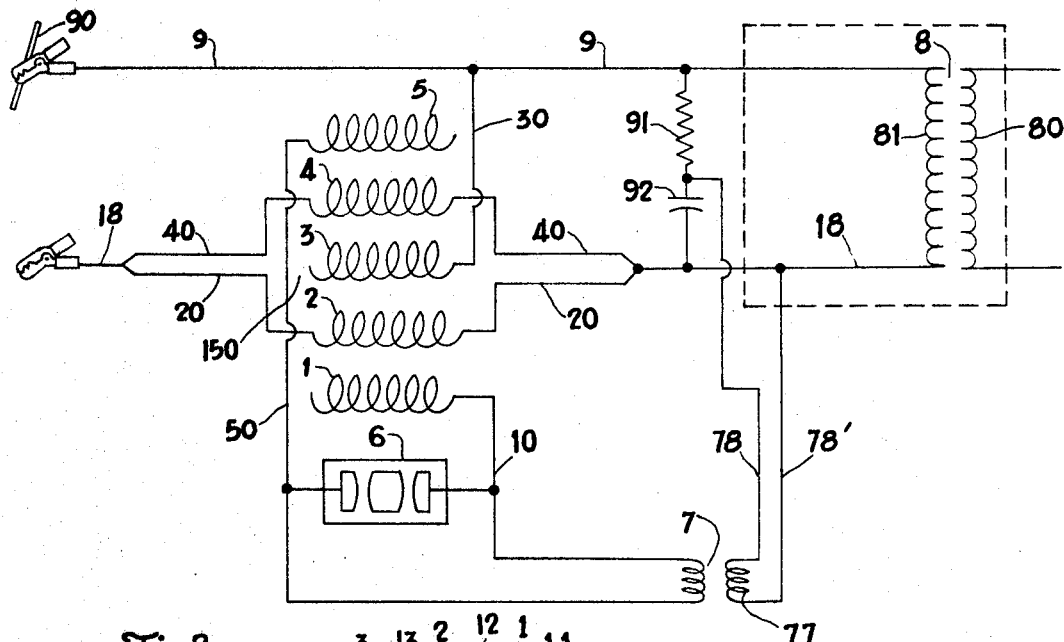
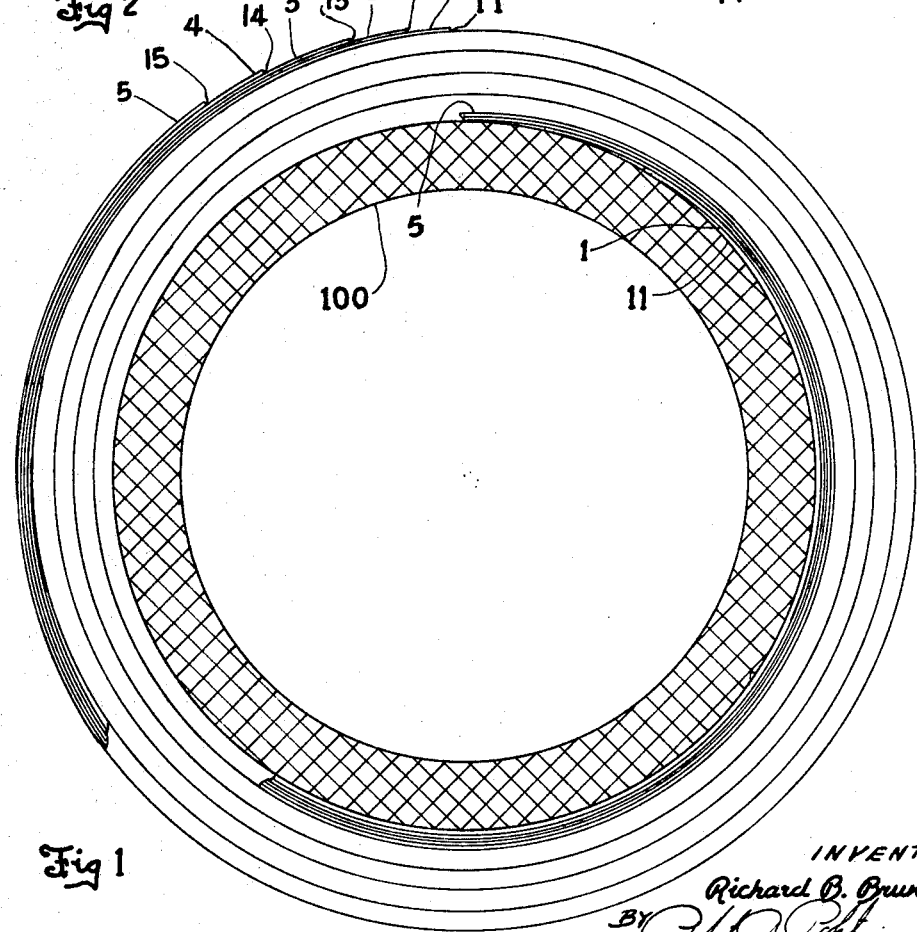
INVENTOR:
Richard B. Brundage
BY
ATTORNEY.

United States Patent Office 3,387,178
Patented June 4, 1968

3,387,178
HIGH FREQUENCY VOLTAGE INJECTOR
CIRCUITS FOR WELDERS
Richard B. Brundage, Ladue, Mo., assignor to Emerson Electric Co., St. Louis County, Mo., a corporation of Missouri
Filed Apr. 1, 1965, Ser. No. 444,618
12 Claims. (Cl. 315—246)

This invention relates to power supply systems for arc-welding applications, primarily alternating current, and particularly to those applications in which a high frequency voltage is injected into the welder circuit.

In welder circuits in which high frequency voltage is injected to facilitate starting of the arc, it is common to use a capacitor which, after being charged to a several thousand volt potential, breaks down and bridges a spark gap, producing a high frequency current damped oscillation in the welding circuit. In present commercial welders, the spark gap oscillator continues to operate as long as the welder is in operation.

The present commercial welders using spark gaps and associated circuitry have certain disadvantages. Among those are broad-spectrum radio frequency interference caused by the high frequency oscillation of the spark gap oscillator, rapid wear of the spark gap, and a marked increase in cost because of the necessity of extra components and an increase in size and complexity of the welder circuit over those of welders which do not employ high frequency voltage.

One of the objects of this invention is to provide an arc welder, with a high frequency arc starting system, which can be produced at a considerably lower cost than such welders known heretofore, which is at least as effective as those known heretofore, and which is less liable to require frequent adjustment than such welders known heretofore.

Another object is to provide a welder with a high frequency arc starting system in which radio frequency interference is reduced.

Another object of this invention is to provide such a welder with increased high frequency voltage and power output in relation to generated high frequency voltage and power, as compared with welders known heretofore.

Another object of this invention is to provide such a welder in which size and complexity of a high frequency circuit are reduced substantially over those known heretofore.

Other objects will become apparent to those skilled in the art in the light of the following description and accompanying drawings.

In accordance with this invention, generally stated, an arc welder is provided with a high frequency arc-starting arrangement embodying a combination inductance-capacitance system which is compact, inexpensive, and produces a high output. In addition, the high frequency system is so constructed that its radio frequency interference is reduced when the high frequency system is in operation as compared with high frequency systems used heretofore, and in the preferred embodiment shown and described is eliminated entirely, for many welding situations once the welding arc has been established, without complicated switching. In the preferred embodiment, the spark gap either does not function or the rate of firing is greatly diminished after the arc is established as long as the arc remains established.

In the drawings,

FIGURE 1 is a cross-sectional view of one embodiment of a coil constructed in accordance with this invention; and FIGURE 2 is a schematic diagram of one embodiment of electrical arc-welder constructed in accordance with this invention.

Referring now to the drawings for one illustrative embodiment of this invention, in which the invention is applied to an A.C. welder, reference numeral 100 refers to a non-conductive, air centered coil core upon which are convolutely wound stacked conductor strips interleaved with insulation strips. An inner insulator strip 11 is the first layer next to the coil core 100, then an inner conductor strip 1; then a second insulator strip 12, over which is a second conductor strip 2; next a center insulation strip 13 and a center conductor strip 3; then a fourth insulation strip 14 and a fourth conductor strip 4; and last, an outer insulation strip 15 over which is an outer conductor strip 5. Thus, between each two adjacent conductor strips there lies an insulation strip.

When conductor strips 1, 2, 3, 4 and 5 are wound around core 100, each becomes in effect a five turn coil, and they will hereinafter sometimes be referred to as such, i.e. coil strip 1. The coil strips are of such a length that they will wind around the core five times, and are offset longitudinally from one another as shown in FIGURE 1 so that the conductor strips are exposed before they are wound, to facilitate the making of connections at the beginning and end of the coil.

Coil strips 1 and 5 are connected by leads 10 and 50 respectively, in parallel with a spark gap 6, to opposite ends of a high voltage, high internal impedance, 60 cycle transformer 7. In this embodiment, a primary coil 77 of the transformer 7 is connected by a conductor 78, through a resistor 91, to an "electrode" output terminal of a tapped welding transformer 8 and through a capacitor 92 to a "ground" output terminal, and by a conductor 78', directly to the "ground" output terminal. The conductor 78 can be connected directly to the "electrode" output terminal, and the resistor 91 and capacitor 92 omitted, but there are certain advantages to be derived from their use. Capacitor 92 and resistor 91 have dual functions: to add stability to the welding arc in the manner of a conventional R.C. circuit, and to limit 60 cycle current output to transformer 7. The weld transformer 8 may be a transformer plus a separate reactor; it is merely an immediate source of current for welding and for the high voltage transformer 7. In the embodiment illustrated, it is provided with a primary 80 energized by a source of alternating current not here shown. Since the voltage in the tapped welding transformer goes to a low value when the welding arc is well established, the voltage across the spark gap 6 falls below the critical level when the arc is established and operation of the high frequency circuit ceases when it is not needed to strike the arc. The high frequency circuit recommences operation whenever the arc is extinguished during the welding operation.

Coil strips 2 and 4 are connected, by leads 20 and 40 respectively, in parallel, to a ground line 18 to a work piece at one end, and at the other, to the secondary 81 of the welding transformer 8. Coil strip 3 is connected by a lead 30 to a conductor 9 from a welding tap of the secondary 81 to an electrode 90.

Electrically, the coil strips have at some radio frequency equal values of inductive reactance measured from start to finish of a coil, and of capacitive reactance measured from one coil to another coil.

In the operation of the illustrative embodiment of welder of this invention described above, coil strips 1 and 5 are charged to a high voltage potential by the high voltage transformer 7. When the potential becomes high enough, the spark gap 6, connected to lead 50 by a lead 65 and to lead 10 by a lead 61, breaks down and effectively shorts the inside coil strip 5 to the outside coil strip 1, commencing a damped oscillation the frequency of which is determined by the distributed capacitance between coil strips 1 and 5, and by the inductance inherent in the five turn coil.

By transformer action, the high frequency oscillation of coil strips 1 and 5 is induced in coils 2, 3 and 4. Coils 2 and 4, which are in parallel and carry the ground side of the weld current, inject this induced high frequency voltage into the welder ground lead 18. Coil strip 3 constitutes one side of a capacitor 150 the other side of which is constituted by coil strips 2 and 4. This capacitor serves to bypass high frequency current around the welding transformer 8. The physical construction is such that with coil strips 4 and 2 enveloping coil strip 3, no insulation breakdown or other coil fault can ever cause sixty cycle high voltage to be applied to the welding cables.

The capacitor 150 has such a value of capacitance that it blocks sixty cycle welding current but passes high frequency current, so that no 60 cycle current flows between the conductor strips 2 and 4 and the coil strips 1, 3 and 5, and no high frequency current passes through the welding transformer 8. At the same time, the few turns of the conductor strips 2 and 4 are of no appreciable significance to the 60 cycle current as far as inductance is concerned, though the turns of the coils 1–5 provide the inductance necessary to cause with the capacitance the electromagnetic oscillations after spark gap discharge. Thus, in the circuit illustrated in FIGURE 2, the 60 cycle welding current circuit consists of the secondary 81, conductors 20 and 40, conductor strips 2 and 4, conductor 9, the work piece and electrode. The high frequency circuit, as far as the arc-starting part is concerned, consists of the coil strip 3 and conductors 30, 9, 18 and 20 and 40, the work piece and the electrode. The two circuits act independently.

The exceptionally high output of the unit is due to exceptionally close coupling between the primary turns, coil strips 1 and 5, and the secondary turns, coil strips 2, 3 and 4, made possible by the physical configuration of the coil.

Purely by way of illustration, and not by way of limitation, the following dimensions have been found to be effective in an operative device of this type.

Coil strips _____inches__ .005 x 1¾ x 36
Insulation strip 11 _____do____ .010 x 2¼ x 36
Insulation strips 12 and 15 _____do____ .010 x 2¼ x 36
Insulation strips 13 and 14 _____do____ .005 x 2¼ x 36
Core circumference _____do_____ 6½
Spark gaps _____ .005×2
HV transformer voltage _____volts RMS__ 2500
HV transformer impedance _____ohms__ 100,000
Resistor 91 _____do____ 40
Capacitor 92 _____microfarads__ 2

The high voltage transformer can be in the nature of a conventional neon sign transformer. With the illustrative dimensions given, the oscillation frequency of the high frequency current is on the order of 2.6 megacycles.

The reason for the substantial reduction in broadband radio frequency interference in the use of the device of this invention is not fully understood, but it is believed that the explanation may be as follows.

In the preferred embodiment, this device provides distributed leakage from the inside turns of the coils to the outside turns. This distributed leakage capacitance decreases the sharpness of the voltage step resulting from air-gap breakdown. This, in turn, decreases radio frequency interference at frequencies away from the resonant frequency.

Numerous changes in and modifications of the construction described may be made without departing from the spirit of this invention or sacrificing its advantages as set forth in the appended claims. Merely by way of example, it can be seen that, instead of using the welder transformer or reactor output for the high voltage transformer input, for the sake of economy a welder transformer or reactor iron and winding can be used for those elements of the high voltage transformer. The layers of insulation and conductor strips can be wound helically instead of convolutely, thus increasing the heat dissipation to permit the use of less material, at the expense of some space and with some sacrifice of performance. The functions of particular conductor strips, as to which carries the welding current and which are initially charged with high voltage, can be varied and interchanged in numerous ways, as will be immediately apparent to those skilled in the art. Conductor strips 1 and 2 might be rolled up together, and then superimposed conductor strips 3 and 5 on them, eliminating conductor strip 4. However, this arrangement has disadvantages in reduced safety, as compared with the preferred embodiment, in which the breakdown of insulation between any two of the conductor strips cannot produce a condition dangerous to the operator. The number of turns of the coil strips can be varied to three, or as many as fifteen for example, by lengthening the strips or by reducing the diameter of the core. These variations are merely illustrative.

Having thus described the invention, what is claimed and desired to be secured by Letters Patent is:

1. In an A.C. welder wherein a welding current is supplied from a welding transformer and a high frequency current is injected into the weld circuit between an electrode and a ground line to a work piece to facilitate starting and stabilizing an arc, the improvement comprising superposed conductor strips having an electrical insulating medium between them, said conductor strips being in the form of coils which have at some radio frequency equal values of inductive reactance measured from start to finish of a coil and of capacitive reactance measured from one coil to another coil; means for inducing a high frequency current in said coils; electrical conductor means connecting electrically one of said conductor strips to one of said electrode and ground lines, and electrical conductor means connecting electrically another conductor strip to the welding transformer and to the other of the electrode and ground lines, said conductor strips and insulating medium constituting a capacitor of a capacitance to block the flow between said conductor strips of low frequency current but to permit free flow of said high frequency current.

2. In an A.C. welder wherein a welding current is supplied from a welding transformer and a high frequency current is injected into the weld circuit between an electrode and ground line to a work piece to facilitate starting and stabilizing an arc, the improvement comprising superposed conductor strips having an electrically insulating medium between them, said conductor strips being in the form of convolutely wound coils which have at some radio frequency equal values of inductive reactance measured from start to finish of a coil and of a capacitive reactance measured from one coil to another coil; means for inducing a high frequency current in said coils; electrical conductor means connecting electrically one of said conductor strips to one of said electrode and ground lines, and electrical conductor means connecting electrically another conductor strip to the welding transformer and to the other of the electrode and ground lines, said conductor strips and insulating medium constituting a capacitor of a capacitance to block the flow between said conductor strips of low frequency current but to permit free flow of said high frequency current.

3. The improvement of claim 2 wherein the said coils contain one to fifteen turns.

4. In an A.C. welder wherein a welding current is supplied from a welding transformer and a high frequency current is injected into the weld circuit between an electrode and a ground line to a work piece to facilitate starting and stabilizing an arc, the improvement comprising a multiplicity of superposed conductor strips successive ones of which have an electrically insulating medium between them, said conductor strips being in the form of coils which have at some radio frequency equal values of inductive reactance measured from start to finish of a coil and of a capacitive reactance measured from one coil to another coil; high voltage means electrically connected, in parallel with circuit interrupting means, to two of said coils; electrical conductor means connecting electrically another of said coils to one of said electrode and ground lines and to the welding transformer; electrical conductor means connecting electrically still another of said coils to the other of said ground and electrode lines, said conductor strips and insulating medium constituting a capacitor of a capacitance to block the flow between said conductor strips of low frequency current but to permit free flow of said high frequency current, and constituting an inductance to provide with said circuit interrupting means, a high frequency oscillation.

5. In an A.C. welder wherein a welding current is supplied from a welding transformer and a high frequency current is injected into the weld circuit between an electrode and a ground line to a work piece to facilitate starting and stabilizing an arc, the improvement comprising five, superposed conductor strips successive ones of which have an electrically insulating medium between them, said conductor strips being in the form of coils which have at some radio frequency equal values of inductive reactance measured from start to finish of a coil and of a capacitive reactance measured from one coil to another coil; high voltage means electrically connected, in parallel with circuit interrupting means, to two of said coils; electrical conductor means connecting electrically two other of said coils in parallel with one another to one of said electrode and ground lines and to the welding transformer; electrical conductor means connecting electrically still another of said coils to the other of said ground and electrode lines, said conductor strips and insulating medium constituting a capacitor of a capacitance to block the flow between said conductor strips of low frequency current but to permit free flow of said high frequency current, and constituting an inductance to provide with said circuit interrupting means, a high frequency oscillation.

6. The improvement of claim 5 wherein the coils have three to fifteen turns.

7. The improvement of claim 5 wherein the two coils connected to the high voltage source are the top and bottom of the superposed conductor strips, the coils connected to the welding transformer are the conductor strips contiguous the top and bottom conductor strips, and the remaining coil, electrically connected to one of the ground and electrode lines, is the center conductor strip of the five superposed conductor strips.

8. The improvement of claim 5 wherein the coils are convolutely wound.

9. The improvement of claim 5 wherein the circuit interrupting means is a spark gap.

10. In an A.C. welder wherein a welding current is supplied from a welding transformer and a high frequency current is injected into the weld circuit between an electrode and a ground line to a work piece to facilitate starting and stabilizing an arc, the improvement comprising superposed conductor strips having an electrically insulating medium between them, said conductor strips being in the form of coils of sufficiently few turns to permit free flow of low frequency current therethrough but to serve as an inductance with respect to high frequency current; means for inducing a high frequency current in said coils; electrical conductor means connecting electrically one of said conductor strips to one of said electrode and ground lines, and electrical conductor means connecting electrically another conductor strip to the welding transformer and to the other of the electrode and ground lines, said conductor strips and insulating medium constituting a capacitor of a capacitance to block the flow between said conductor strips of low frequency current but to permit free flow of said high frequency current.

11. In an A.C. welder having a welding transformer having electrode and ground output leads, a high voltage transformer having primary and secondary windings, means connected to the secondary windings of said high voltage transformer for generating high frequency current and connected to inject said high frequency current into the weld circuit, the improvement comprising leads electrically connecting the said primary winding of the high voltage transformer to the electrode and ground output leads respectively of the welding transformer.

12. The improvement of claim 11 wherein a resistor and a capacitor are connected in series with one another and between and to the electrode and ground output leads, and one of the leads from the primary winding of the high voltage transformer is connected between the resistor and the capacitor, hence, through said resistor, electrically to one of said electrode and ground output leads, and the other of said leads from the primary winding of the high voltage transformer is connected to the other of said electrode and ground output leads.

References Cited
UNITED STATES PATENTS

| | | | |
|---|---|---|---|
| 2,529,715 | 11/1950 | Tyrner et al. | 315—278 X |
| 2,561,995 | 7/1951 | Roberts | 315—278 X |

JOHN W. HUCKERT, *Primary Examiner.*

R. F. POLISSACK, *Assistant Examiner.*